(12) United States Patent
Yamaguchi et al.

(10) Patent No.: US 12,623,546 B2
(45) Date of Patent: May 12, 2026

(54) STORAGE BATTERY CONTROL APPARATUS

(71) Applicant: DENSO CORPORATION, Kariya-city (JP)

(72) Inventors: Ryuta Yamaguchi, Kariya-city (JP); Yamato Utsunomiya, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 722 days.

(21) Appl. No.: 18/151,571

(22) Filed: Jan. 9, 2023

(65) Prior Publication Data

US 2023/0173924 A1 Jun. 8, 2023

Related U.S. Application Data

(63) Continuation of application No. PCT/JP2021/023666, filed on Jun. 22, 2021.

(30) Foreign Application Priority Data

Jul. 10, 2020 (JP) ................................. 2020-119244

(51) Int. Cl.
*B60L 3/00* (2019.01)
*B60L 50/60* (2019.01)
(Continued)

(52) U.S. Cl.
CPC ............. *B60L 3/0046* (2013.01); *B60L 50/60* (2019.02); *B60L 53/18* (2019.02); *B60L 53/62* (2019.02);
(Continued)

(58) Field of Classification Search
CPC ........ B60L 3/0046; B60L 50/60; B60L 53/62; B60L 58/15; B60L 53/18; B60L 2210/40;
(Continued)

(56) References Cited

U.S. PATENT DOCUMENTS 5,703,466 A * 12/1997 Honda ................ H02J 7/00712
320/152
6,501,250 B2 * 12/2002 Bito ........................ B60L 58/10
320/152

(Continued)

FOREIGN PATENT DOCUMENTS

EP 0334474 A2 * 9/1989 .............. B60L 53/11
FR 2936193 A1 * 3/2010 .............. B60Q 11/00
JP 2020056756 A * 4/2020 .............. Y02E 60/10

*Primary Examiner* — M Baye Diao
(74) *Attorney, Agent, or Firm* — Oliff PLC

(57) ABSTRACT

A power supply system includes a storage battery and first and second current sensors for detecting electric current flowing to the storage battery. The second current sensor has a wider current detection range than the first current sensor. A storage battery control apparatus includes: an abnormality determination unit that determines whether an abnormality has occurred in the first current sensor; a first charging control unit that performs, when no abnormality has occurred in the first current sensor, a charging completion determination based on the electric current detected by the first current sensor; and a second charging control unit that performs, when an abnormality has occurred in the first current sensor, the charging completion determination based on the electric current detected by the second current sensor. The first charging control unit and the second charging control unit have different determination criteria for determining completion of the charging of the storage battery.

9 Claims, 8 Drawing Sheets

(51) Int. Cl.
| | |
|---|---|
| B60L 53/18 | (2019.01) |
| B60L 53/62 | (2019.01) |
| B60L 58/15 | (2019.01) |
| H01M 10/46 | (2006.01) |
| H02J 7/00 | (2026.01) |

(52) U.S. Cl.
CPC ............. B60L 58/15 (2019.02); H01M 10/46 (2013.01); H02J 7/00302 (2020.01); H02J 7/0047 (2013.01); H02J 7/00714 (2020.01); B60L 2210/40 (2013.01)

(58) Field of Classification Search
CPC ......... B60L 2240/545; B60L 2240/547; B60L 2240/549; B60L 3/0038; B60L 3/12; B60L 58/16; B60L 53/14; H01M 10/46; H01M 10/44; H01M 10/48; H02J 7/00302; H02J 7/0047; H02J 7/00714; H02J 2310/48; H02J 7/00304; H02J 7/02; H02J 7/00; H02J 7/04; H02J 7/06; G01R 31/385; G01R 35/00; G01R 35/02; Y02E 60/10; Y02T 10/70; Y02T 10/7072; Y02T 90/14; H02H 7/18

USPC ......................................................... 320/162
See application file for complete search history.

(56) References Cited

U.S. PATENT DOCUMENTS

| | | | | |
|---|---|---|---|---|
| 7,570,021 | B2* | 8/2009 | Togashi | B60W 10/26 |
| | | | | 320/136 |
| 7,714,543 | B2* | 5/2010 | Yoshida | H02J 7/007182 |
| | | | | 320/134 |
| 8,306,692 | B2* | 11/2012 | Ishishita | H02J 7/00309 |
| | | | | 318/140 |
| 8,829,857 | B2* | 9/2014 | Minamiura | H01M 10/486 |
| | | | | 320/136 |
| 9,261,038 | B2* | 2/2016 | Nishida | F02D 41/28 |
| 10,436,847 | B2* | 10/2019 | Iwane | G01R 31/378 |
| 11,002,794 | B2* | 5/2021 | Takada | G01R 31/3828 |
| 2011/0204852 | A1* | 8/2011 | Saruhashi | H01M 10/441 |
| | | | | 320/134 |
| 2012/0056587 | A1* | 3/2012 | Iida | H01M 10/443 |
| | | | | 320/134 |
| 2012/0268066 | A1 | 10/2012 | Endo et al. | |
| 2017/0225635 | A1* | 8/2017 | Obayashi | F02B 39/10 |
| 2021/0370789 | A1* | 12/2021 | Kawai | H02J 7/0047 |

* cited by examiner

FIG.7

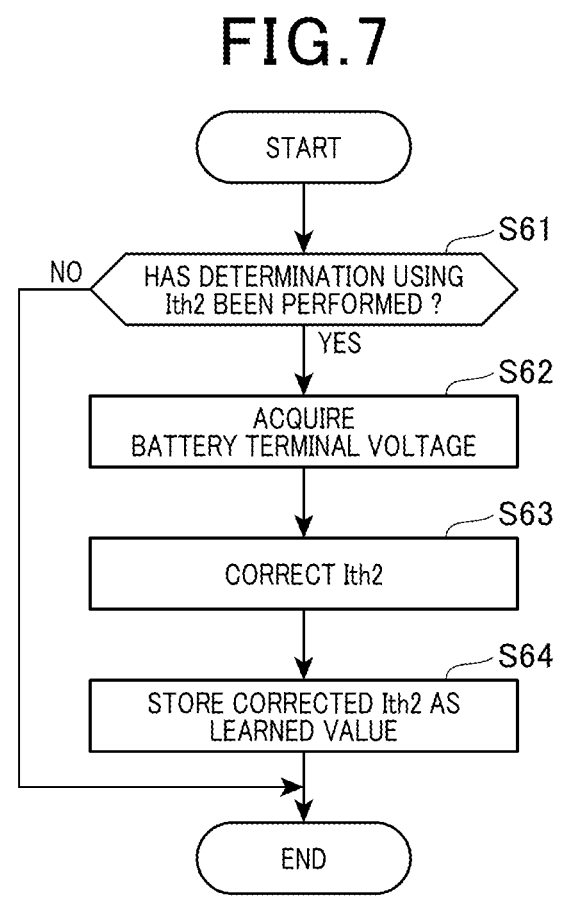

START

↓

S61

NO ◁ HAS DETERMINATION USING
Ith2 BEEN PERFORMED ?

YES

↓

S62

ACQUIRE
BATTERY TERMINAL VOLTAGE

↓

S63

CORRECT Ith2

↓

S64

STORE CORRECTED Ith2 AS
LEARNED VALUE

↓

END

START

ACQUIRE BATTERY
DETERIORATION INFORMATION —S71

SET Ith2 —S72

STORE SET Ith2 AS
LEARNED VALUE —S73

END (LARGE)

Ith2

(HIGH)

DETERIORATION DEGREE

STORAGE BATTERY CONTROL APPARATUS

CROSS-REFERENCE TO RELATED APPLICATIONS

The present application is a continuation application of International Application No. PCT/JP2021/023666 filed on Jun. 22, 2021, which is based on and claims priority from Japanese Patent Application No. 2020-119244 filed on Jul. 10, 2020. The entire contents of these applications are incorporated by reference into the present application.

BACKGROUND

1. Technical Field

The present disclosure relates to storage battery control apparatuses.

2. Description of Related Art

There is known a charging control apparatus for a storage battery that is included in a power supply system of a vehicle and can be charged by a charging apparatus provided outside the vehicle. The charging control apparatus includes a current detection unit having at least one current sensor for detecting electric current inputted to the storage battery and configured to output first and second detected values of the electric current. The first detected value has a first resolution, whereas the second detected value has a second resolution higher than the first resolution. When charging power calculated using the first detected value exceeds a predetermined limit value, the charging control apparatus controls a charger so as to reduce the charging power. Otherwise, the charging control apparatus controls, based on charging power calculated using the second detected value, the charger so as to bring the storage battery into a predetermined fully-charged state.

SUMMARY

According to the present disclosure, there is provided a storage battery control apparatus to be applied to a power supply system. The power supply system includes a storage battery and first and second current sensors that detect electric current inputted/outputted to/from the storage battery. The first current sensor has a first current detection range, whereas the second current sensor has a second current detection range that is wider than the first current detection range. The storage battery control apparatus is configured to perform a charging completion determination when the storage battery is charged by a charging apparatus. The storage battery control apparatus includes: an abnormality determination unit that determines whether an abnormality has occurred in the first current sensor; a first charging control unit that performs, when it is determined by the abnormality determination unit that no abnormality has occurred in the first current sensor, the charging completion determination based on the electric current detected by the first current sensor; and a second charging control unit that performs, when it is determined by the abnormality determination unit that an abnormality has occurred in the first current sensor, the charging completion determination based on the electric current detected by the second current sensor. Moreover, a determination criterion with which the first charging control unit performs the charging completion determination is different from a determination criterion with which the second charging control unit performs the charging completion determination.

BRIEF DESCRIPTION OF THE DRAWINGS

FIG. 7 is a flowchart illustrating steps of a correction process for correcting a second threshold value according to a fifth embodiment.

DESCRIPTION OF EMBODIMENTS

Figure 1:
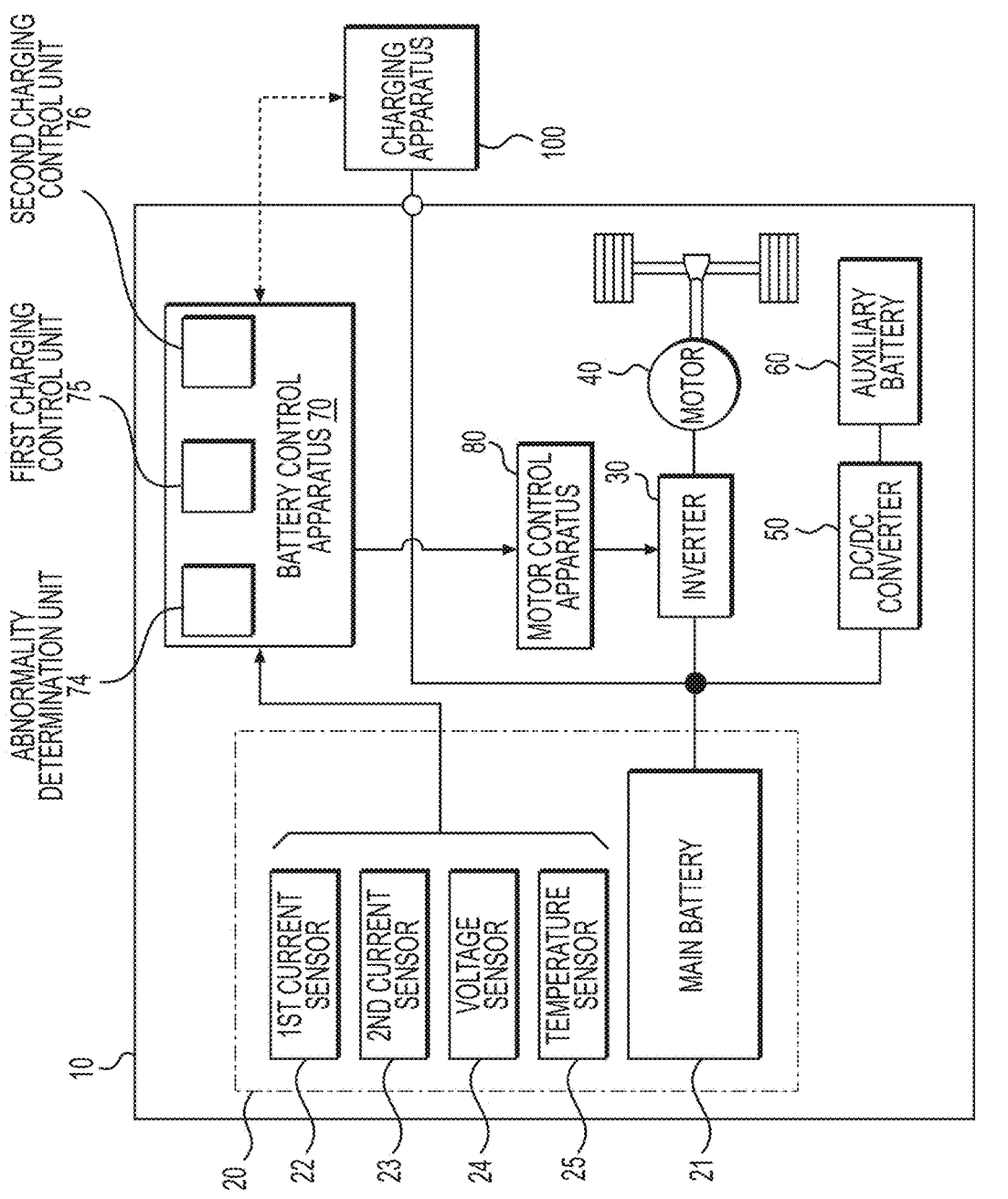
FIG. 1 is a configuration diagram of a power supply system of a vehicle, which includes a storage battery control apparatus according to a first embodiment.

The inventors of the present application have found that the charging control apparatus known in the art (see, for example, Japanese Patent Application Publication No. JP2011050175A) may involve the following problem. That is, if an abnormality occurs in the at least one current sensor, it may become impossible to detect the electric current inputted to the storage battery; thus, it may become difficult to suitably charge the storage battery.

The present disclosure has been accomplished in view of the above problem.

In the above-described storage battery control apparatus according to the present disclosure, when an abnormality has occurred in the first current sensor, the storage battery control apparatus uses the second current sensor instead of the first current sensor and performs the charging completion determination based on the electric current detected by the second current sensor during the charging of the storage battery by the charging apparatus. Moreover, in the charging control based on the electric current detected by the first current sensor and the charging control based on the electric current detected by the second current sensor, different determination criteria are respectively used for determining completion of the charging of the storage battery by the charging apparatus. The first current sensor has the first current detection range, whereas the second current sensor has the second current detection range that is wider than the first current detection range. Therefore, the second current sensor is lower in detection resolution and larger in detection error than the first current sensor. Consequently, in the case of the charging completion determination being performed using the second current sensor instead of the first current sensor, the accuracy of the charging completion determination may be lowered due to the difference in detection range (or difference in magnitude of detection error) between the first and second current sensors. In this regard, in the storage battery control apparatus according to the present disclosure, since the determination criteria for performing the charging completion determination is changed with the change in the current sensor used for the charging completion determination, it becomes possible to suppress the accuracy of the charging completion determination from being lowered. As a result, it becomes possible to suitably perform the charging control even when an abnormality has occurred in the first current sensor.

In one embodiment of the present disclosure, the first charging control unit determines that the charging of the storage battery has been completed in response to the electric current detected by the first current sensor having become lower than or equal to a first threshold value. The second charging control unit determines that the charging of the storage battery has been completed in response to the electric current detected by the second current sensor having become lower than or equal to a second threshold value larger than the first threshold value.

As described above, the second current sensor is lower in detection resolution and larger in detection error than the first current sensor. Consequently, in the case of the charging completion determination being performed based on the electric current detected by the second current sensor, overcharging of the storage battery may occur. In this regard, in the embodiment of the present disclosure, the first threshold value is used as the determination criterion for the charging completion determination based on the electric current detected by the first current sensor, whereas the second threshold larger than the first threshold value is used as the determination criterion for the charging completion determination based on the electric current detected by the second current sensor. Consequently, it becomes possible to determine, when an abnormality has occurred in the first current sensor, completion of the charging of the storage battery in an early stage. As a result, it becomes possible to terminate the charging of the storage battery in a timely manner, thereby suppressing occurrence of overcharging of the storage battery.

In a further implementation of the embodiment, the storage battery control apparatus controls the charging of the storage battery by the charging apparatus so that constant-current charging is first performed and then constant-voltage charging is performed. In the constant-current charging, the storage battery is charged with the charging current of the charging apparatus kept at a constant value. In the constant-voltage charging, the storage battery is charged with the charging voltage of the charging apparatus kept at a constant value. A target voltage in the constant-voltage charging is set to be lower when the charging completion determination is performed by the second charging control unit than when the charging completion determination is performed by the first charging control unit.

In the case of performing the charging completion determination using the second current sensor that is lower in detection resolution than the first current sensor, when the constant-voltage charging rapidly progresses, the charging completion determination may be delayed, resulting in overcharging of the storage battery. In this regard, in the further implementation of the embodiment, the target voltage in the constant-voltage charging is set to be lower when the charging completion determination is performed based on the electric current detected by the second current sensor than when the charging completion determination is performed based on the electric current detected by the first current sensor. Consequently, it becomes possible to more reliably suppress occurrence of overcharging of the storage battery.

In another embodiment of the present disclosure, the storage battery control apparatus controls the charging of the storage battery by the charging apparatus so that constant-current charging is first performed and then constant-voltage charging is performed. In the constant-current charging, the storage battery is charged with the charging current of the charging apparatus kept at a constant value. In the constant-voltage charging, the storage battery is charged with the charging voltage of the charging apparatus kept at a constant value. The first charging control unit determines that the charging of the storage battery has been completed in response to the electric current detected by the first current sensor having become lower than or equal to a first threshold value. The second charging control unit determines that the charging of the storage battery has been completed in response to the electric current detected by the second current sensor having become lower than or equal to a second threshold value larger than the first threshold value or to a predetermined time having elapsed from the start of the constant-voltage charging, whichever comes first.

With the above configuration, it becomes possible to perform the charging completion determination in an early stage and thereby suppress occurrence of overcharging of the storage battery, while taking into account that the second current sensor is lower in detection resolution and larger in detection error than the first current sensor. Moreover, if the predetermined time has elapsed from the start of the constant-voltage charging and before establishment of the charging completion determination using the second threshold value as the determination criterion, it is determined, at the timing when the predetermined time has elapsed, that the charging of the storage battery has been completed. Consequently, in the case of the charging completion determination being performed using the second current sensor, even if the charging completion determination cannot be properly performed due to an error contained in the electric current detected by the second current sensor, it is still possible to terminate the constant-voltage charging in response to the predetermined time having elapsed from the start of the constant-voltage charging. As a result, it becomes possible to more reliably suppress occurrence of overcharging of the storage battery.

In yet another embodiment of the present disclosure, the storage battery control apparatus controls the charging of the storage battery by the charging apparatus so that constant-current charging is first performed and then constant-voltage charging is performed. In the constant-current charging, the storage battery is charged with the charging current of the charging apparatus kept at a constant value. In the constant-voltage charging, the storage battery is charged with the charging voltage of the charging apparatus kept at a constant value. The charging mode of the storage battery is selectable between a normal charging mode and a rapid charging mode. The first charging control unit determines that the charging of the storage battery has been completed in response to the electric current detected by the first current sensor having become lower than or equal to a first threshold value. When the charging mode is the normal charging mode, the second charging control unit determines that the charging of the storage battery has been completed in response to the electric current detected by the second current sensor having become lower than or equal to a second threshold value larger than the first threshold value. When the charging mode is the rapid charging mode, the second charging control unit determines that the charging of the storage battery has been completed in response to the constant-current charging having been completed.

In the case of performing the charging completion determination using the second current sensor that is lower in detection resolution than the first current sensor, when the constant-voltage charging rapidly progresses, the charging completion determination may be delayed, resulting in overcharging of the storage battery. In particular, when the charging mode in the constant-voltage charging is the rapid charging mode, overcharging of the storage battery is more likely to occur. In this respect, with the above configuration, the timing of the charging completion determination in the rapid charging mode can be made earlier than the timing of the charging completion determination in the normal charging mode, thereby suppressing occurrence of overcharging of the storage battery.

In a further implementation of the above embodiments, the storage battery control apparatus further includes a correction unit that acquires, when the charging completion determination has been performed by the second charging control unit using the second threshold value, a terminal voltage of the storage battery after the completion of the charging of the storage battery and corrects the second threshold value based on the acquired terminal voltage of the storage battery.

The second threshold value, which is compared with the electric current detected by the second current sensor, may be set taking into account the magnitude of the error contained in the electric current detected by the second current sensor. In order to suppress occurrence of overcharging of the storage battery, it is preferable to provide a large margin for the second threshold value. On the other hand, however, if the second threshold value is too large, the charging of the storage battery may be excessively limited. In this respect, with the above configuration, it becomes possible to determine, based on the terminal voltage of the storage battery, undercharging of the storage battery with respect to a fully-charged state thereof. Consequently, it becomes possible to suppress occurrence of undercharging of the storage battery as well as occurrence of overcharging of the storage battery.

Hereinafter, exemplary embodiments will be described in detail with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

FIG. 1 illustrates the configuration of a power supply system of an electric vehicle 10 that includes a motor 40 as a driving power source. The power supply system includes a battery control apparatus 70 according to the first embodiment. In addition, the battery control apparatus 70 corresponds to a "storage battery control apparatus" in the claims.

As shown in FIG. 1, the vehicle 10 includes a main battery 21, an inverter 30 that converts DC power outputted from the main battery 21 into AC power and outputs the resultant AC power, and the aforementioned motor 40 that is an electrical load driven by the AC power outputted from the inverter 30.

During traveling of the vehicle 10, electric power is supplied, in response to an accelerator operation by the driver, from the main battery 21 to the motor 40 via the inverter 30. Consequently, traveling power is applied to the vehicle 10 by a power running drive of the motor 40 with the supply of electric power. The motor 40 is a rotating electric machine (more specifically, a motor-generator) that has an electric power generation function as well as a power running (or torque generation) function. For example, during deceleration of the vehicle 10, electric power, which is generated by regenerative power generation of the motor 40, is supplied to the main battery 21 via the inverter 30. In this case, the motor 40 functions as an electric generator; and the main battery 21 is charged with the electric power generated by the motor 40. In addition, the main battery 21 corresponds to a "storage battery" in the claims.

The main battery 21 is a rechargeable storage battery that is an assembled battery in which a plurality of battery cells are connected in series with each other. The main battery 21 may be implemented by, for example, a lithium-ion battery having an output voltage of about several hundred volts. The main battery 21 is integrated with various sensors into a battery unit 20. Specifically, the battery unit 20 includes first and second current sensors 22 and 23 for detecting electric current inputted/outputted to/from the main battery 21, a voltage sensor 24 for detecting the terminal voltage of the main battery 21, and a temperature sensor 25 for detecting the temperature of the main battery 21.

Moreover, to the main battery 21, there is connected an auxiliary battery 60 via a DC/DC converter 50 that is an electric power converter. The auxiliary battery 60 has a lower rated voltage than the main battery 21. The auxiliary battery 60 may be implemented by, for example, a lead-acid battery having an output voltage of about 12V. The DC/DC converter 50 steps down the output voltage of the main battery 21 to a lower voltage, and applies the lower voltage to the auxiliary battery 60.

Furthermore, the main battery 21 can be charged with electric power supplied from an external charging apparatus 100. The external charging apparatus 100 may be, for example, a charger installed in a charging station. The external charging apparatus 100 may be connected to the vehicle 10 via a charging cable, thereby allowing electric power to be supplied from the external charging apparatus 100 to the main battery 21. The external charging apparatus 100 is configured to be capable of performing any of the following operations: (1) outputting electric power at a constant current; (2) outputting electric power at a constant voltage; and (3) outputting electric power at a constant voltage and a constant current.

The vehicle 10 also includes a battery control apparatus 70 and a motor control apparatus 80, each of which is mainly composed of a microcomputer having a CPU and various memories. The battery control apparatus 70 and the motor control apparatus 80 are connected, by a communication network such as CAN, to communicate with each other. Moreover, the battery control apparatus 70 and the external charging apparatus 100 can communicate with each other through the charging cable for externally charging the main battery 21 or through communication means such as a wireless LAN.

These control apparatuses 70 and 80 respectively perform, by suitably using information detected by the various sensors of the battery unit 20, control related to charging/discharging of the main battery 21 and control related to driving of the motor 40. In the present embodiment, of the various sensors of the battery unit 20, the first and second current sensors 22 and 23 have different detection ranges. Specifically, the current detection range of the first current sensor 22 is defined as a first range, whereas the current detection range of the second current sensor 23 is defined as a second range that is wider than the first range. The battery control apparatus 70 performs, based on the electric current detected by the first current sensor 22, charging control during the charging of the main battery 21 by the external charging apparatus 100. On the other hand, the motor control apparatus 80 performs traveling control by driving the motor 40 based on the electric current detected by the second current sensor 23.

In addition, in the present embodiment, since the first current sensor 22 has a narrower current detection range than the second current sensor 23, the detection resolution of the first current sensor 22 is higher and the detection error of the first current sensor 22 is smaller. Conversely, since the second current sensor 23 has a wider current detection range than the first current sensor 22, the detection resolution of the second current sensor 23 is lower and the detection error of the second current sensor 23 is larger.

In the present embodiment, during the charging of the main battery 21 by the external charging apparatus 100, the battery control apparatus 70 performs charging control so as to charge the main battery 21 by a CC-CV charging method. Here, "CC charging" denotes a constant-current charging mode in which the main battery 21 is charged with the charging current of the external charging apparatus 100 kept at a constant value; and "CV charging" denotes a constant-voltage charging mode in which the main battery 21 is charged with the charging voltage of the external charging apparatus 100 kept at a constant value.

Figure 2:
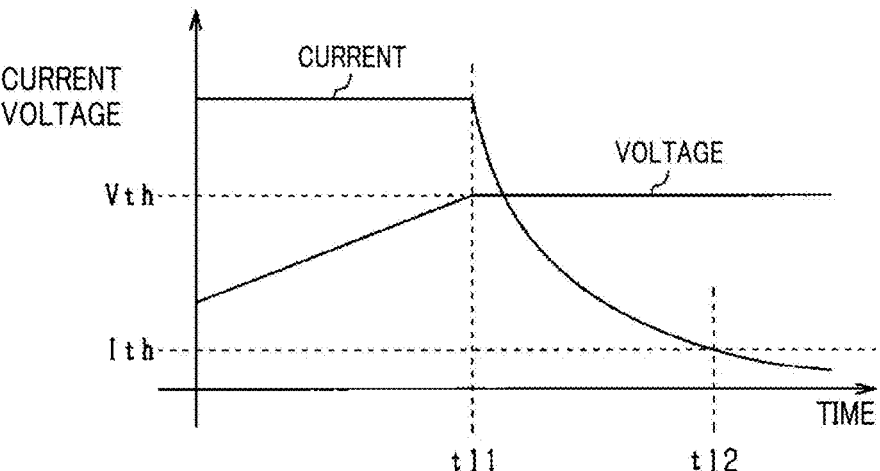
FIG. 2 is a timing chart illustrating CC charging and CV charging.

The CC-CV charging method will be described with reference to FIG. 2. In FIG. 2, there are shown both change in the terminal voltage of the main battery 21 and change in the charging current flowing to the main battery 21 after start of the charging of the main battery 21 by the external charging apparatus 100.

As shown in FIG. 2, during a CC charging period from the start of the charging to timing t11, the CC charging is performed such that the charging current is kept at a constant value. During the CC charging period, the terminal voltage of the main battery 21 gradually increases with the lapse of time. Moreover, during the CC charging period, the battery control apparatus 70 sets a target current and controls the output current of the external charging apparatus 100 so as to bring the charging current actually flowing to the main battery 21 (i.e., the electric current detected by the first current sensor 22) into agreement with the target current.

At the timing t11, upon satisfying a predetermined condition for switching the charging mode of the main battery 21 from the CC charging to the CV charging, the charging mode is switched from the CC charging to the CV charging. For example, the terminal voltage of the main battery 21 may be used as a parameter for determining whether to switch the charging mode. Specifically, the charging mode may be switched from the CC charging to the CV charging on condition that the terminal voltage of the main battery 21 has increased to reach a predetermined voltage threshold Vth. Alternatively, the charging mode may be switched from the CC charging to the CV charging on condition that a predetermined time has elapsed from the start of the CC charging. After the timing t11, the external charging apparatus 100 is instructed with a target voltage in the CV charging from battery control apparatus 70.

From the timing t11 on, the CV charging is performed such that the charging voltage is kept at a constant value. During the CV charging period, the charging current of the main battery 21 gradually decreases with the lapse of time. Then, at timing t12, upon the charging current of the main battery 21 having decreased to a predetermined current threshold value Ith (or cutoff current), the charging of the main battery 21 is terminated. At this time, based on the fact that the electric current detected by the first current sensor 22 has decreased to the current threshold value Ith, the battery control apparatus 70 determines that the charging of the main battery 21 has been completed.

During the charging of the main battery 21 by the external charging apparatus 100, the output current detected by the external charging apparatus 100 is transmitted as the output current information to the battery control apparatus 70. For example, the external charging apparatus 100 may detect the output current thereof by current detection means such as a current sensor provided in the external charging apparatus 100; then, the external charging apparatus 100 may transmit the detected output current as the output current information to the battery control apparatus 70. The battery control apparatus 70 compares the output current information transmitted from the external charging apparatus 100 with the electric current detected by the first current sensor 22 during the charging of the main battery 21 by the external charging apparatus 100. If there is a difference therebetween, the battery control apparatus 70 commands the external charging apparatus 100 to correct the output current. For example, when the output current indicated by the output current information transmitted from the external charging apparatus 100 is 100 amperes and the electric current detected by the first current sensor 22 is 95 amperes, the battery control apparatus 70 commands the external charging apparatus 100 to increase the output current by the difference of 5 amperes.

If an abnormality occurs in the first current sensor 22 used for the charging control during the charging of the main battery 21 by the external charging apparatus 100, it may become impossible to detect the charging current; thus, it may become impossible to perform the charging completion determination based on the electric current detected by the first current sensor 22. In this case, the second current sensor 23 may be used, instead of the first current sensor 22, for the charging control during the charging of the main battery 21 by the external charging apparatus 100. However, the second current sensor 23 is lower in detection resolution and larger in detection error than the first current sensor 22; consequently, the accuracy of the charging completion determination may be lowered.

In view of the above, in the present embodiment, the battery control apparatus 70 is configured to include: an abnormality determination unit 74 that determines whether an abnormality has occurred in the first current sensor 22; a first charging control unit 75 that performs, when it is determined that no abnormality has occurred in the first current sensor 22, the charging completion determination based on the electric current detected by the first current sensor 22 during the charging of the main battery 21 by the external charging apparatus 100; and a second charging control unit 76 that performs, when it is determined that an abnormality has occurred in the first current sensor 22, the charging completion determination based on the electric current detected by the second current sensor 23 during the charging of the main battery 21 by the external charging apparatus 100. Moreover, a determination criterion with which the first charging control unit 75 performs the charging completion determination is different from a determination criterion with which the second charging control unit 76 performs the charging completion determination. In other words, the first charging control unit 75 and the second charging control unit 76 have different determination criteria for determining completion of the charging of the main battery 21 by the external charging apparatus 100.

Figure 3:
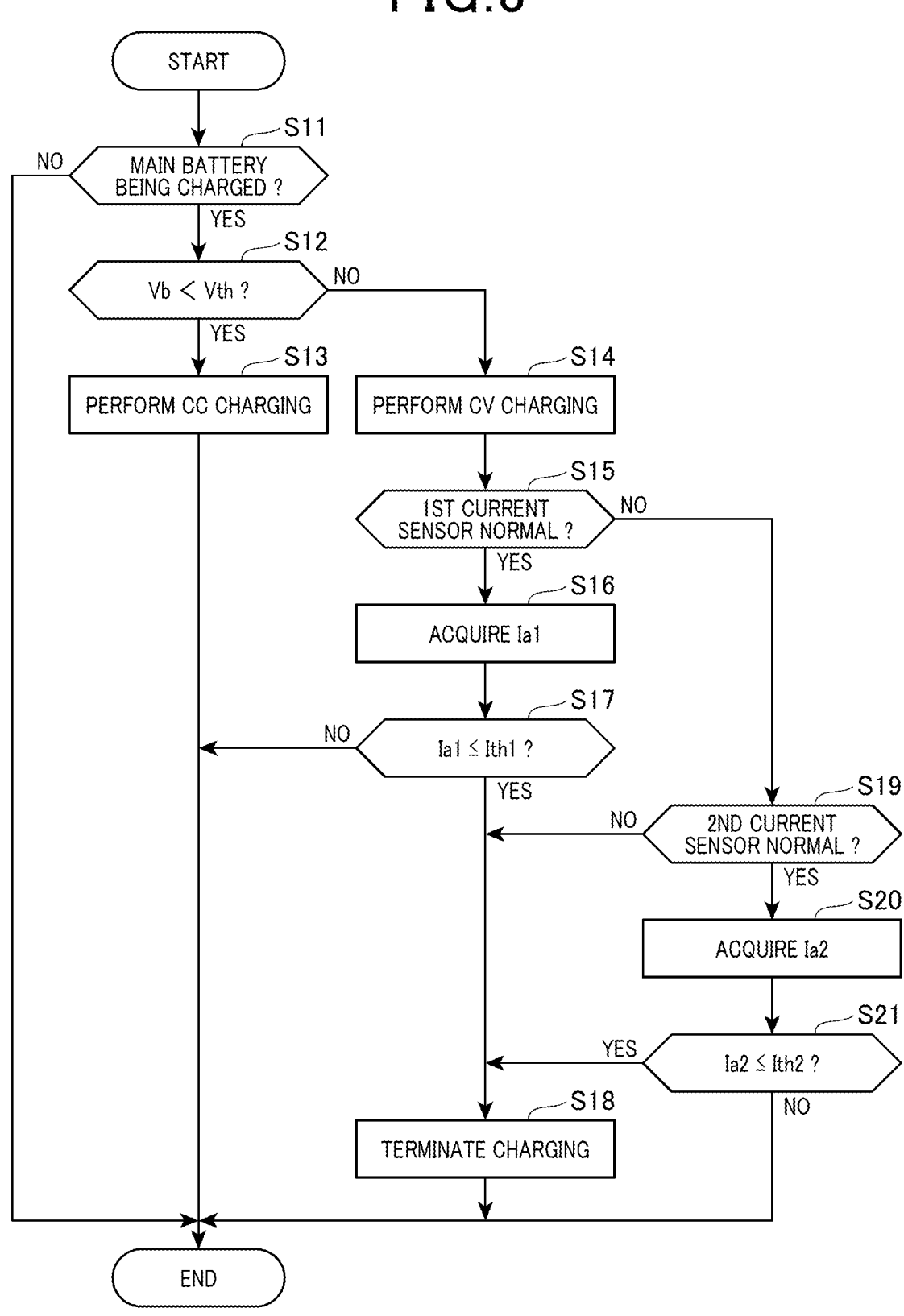
FIG. 3 is a flowchart illustrating steps of a charging control process according to the first embodiment.

FIG. 3 illustrates steps of a charging control process performed by the battery control apparatus 70 during the charging of the main battery 21 by the external charging apparatus 100. This process is repeated by the battery control apparatus 70 at a predetermined cycle when an IG switch of the vehicle 10 is in an OFF state and it is necessary to charge the main battery 21 with electric power supplied from the external charging apparatus 100.

As shown in FIG. 3, upon start of the charging control process, in step S11, it is determined whether the main battery 21 is being charged by the external charging apparatus 100. Specifically, in this step, it is determined whether the external charging apparatus 100 is connected with the vehicle 10 via the charging cable and whether the battery control apparatus 70 can communicate with the external charging apparatus 1001.

If the determination in step S11 results in a "NO", the charging control process directly terminates without performing the remaining steps. In contrast, if the determination in step S11 results in a "YES" answer, the charging control process proceeds to step S12.

In step S12, it is determined whether the terminal voltage Vb of the main battery 21 is lower than the predetermined voltage threshold Vth.

If the determination in step S12 results in a "YES", the charging control process proceeds to step S13.

In step S13, the CC charging is performed such that the charging current of the external charging apparatus 100 is kept at a constant value.

During the CC charging period, the terminal voltage Vb of the main battery 21 gradually increases with the lapse of time. When the terminal voltage Vb of the main battery 21 has increased to reach the predetermined voltage threshold Vth, the determination in step S12 will result in a "NO" answer and thus the charging control process will proceed to step S14.

In step S14, the CV charging is performed such that the charging voltage of the external charging apparatus 100 is kept at a constant value.

In step S15, it is determined whether the first current sensor 22 is normal.

In addition, in this step, any abnormality determination method may be used for the first current sensor 22. For example, when the electric current detected by the first current sensor 22 remains zero or remains at a maximum detected value, it may be determined that an abnormality has occurred in the first current sensor 22. Moreover, an abnormality determination process may be performed for the first current sensor 22 when the IG switch of the vehicle 10 is in an ON state as well as when the main battery 21 is charged by the external charging apparatus 100; and the results of the abnormality determination process may be stored in a backup memory such as a backup RAM or EEPROM.

If the first current sensor 22 is normal and thus the determination in step S15 results in a "YES" answer, the charging control process proceeds to step S16.

In step S16, the electric current Ia1 detected by the first current sensor 22 is acquired.

In subsequent step S17, it is determined whether the electric current Ia1 detected by the first current sensor 22 is lower than or equal to a first threshold value Ith1.

Specifically, the first threshold value Ith1 is a current value (or cutoff current) that serves as a determination criterion for determining completion of the charging of the main battery 21 by the external charging apparatus 100. When the electric current Ia1 detected by the first current sensor 22 becomes lower than or equal to the first threshold value Ith1, it is determined that the charging of the main battery 21 by the external charging apparatus 100 has been completed.

If the determination in step S17 results in a "NO" answer, the charging control process directly terminates without performing the remaining steps. Consequently, the CV charging is continued.

In contrast, if the determination in step S17 results in a "YES" answer, the charging control process proceeds to step S18.

In step S18, the charging of the main battery 21 by the external charging apparatus 100 is terminated.

On the other hand, if the first current sensor 22 is abnormal and thus the determination in step S15 results in a "NO" answer, the charging control process proceeds to step S19.

In step S19, it is determined whether the second current sensor 23 is normal.

If the second current sensor 23 is normal and thus the determination in step S19 results in a "YES" answer, the charging control process proceeds to step S20.

In step S20, the electric current Ia2 detected by the second current sensor 23 is acquired.

In subsequent step S21, it is determined whether the electric current Ia2 detected by the second current sensor 23 is lower than or equal to a second threshold value Ith2.

Specifically, the second threshold value Ith2 is a current value (or cutoff current) that is used, instead of the first threshold value Ith1, as a determination criterion for determining completion of the charging of the main battery 21 by the external charging apparatus 100. The second threshold value Ith2 is larger than the first threshold value Ith1 (i.e., Ith2>Ith1).

If the determination in step S21 results in a "YES" answer, the charging control process proceeds to step S18, in which the charging of the main battery 21 by the external charging apparatus 100 is terminated.

In contrast, if the determination in step S21 results in a "NO" answer, the charging control process directly terminates without performing step S18. Consequently, the CV charging is continued.

Otherwise, if both the first current sensor 22 and the second current sensor 23 are abnormal and thus the determination in step S19 results in a "NO" answer, the charging control process proceeds to step S18, in which the charging of the main battery 21 by the external charging apparatus 100 is terminated.

According to the present embodiment, it is possible to achieve the following advantageous effects.

In the present embodiment, when an abnormality has occurred in the first current sensor 22, the battery control apparatus 70 uses the second current sensor 23 instead of the first current sensor 22 and performs the charging completion determination based on the electric current Ia2 detected by the second current sensor 23 during the charging of the main battery 21 by the external charging apparatus 100. Moreover, in the charging control based on the electric current Ia1 detected by the first current sensor 22 and the charging control based on the electric current Ia2 detected by the second current sensor 23, different determination criteria are respectively used for determining completion of the charging of the main battery 21 by the external charging apparatus 100. In the case of the charging completion determination being performed using the second current sensor 23 instead of the first current sensor 22, the accuracy of the charging completion determination may be lowered due to the difference in detection range (or difference in magnitude of detection error) between the first and second current sensors 22 and 23. In this regard, in the present embodiment, since the determination criteria for performing the charging completion determination is changed with the change in the current sensor used for the charging completion determination, it becomes possible to suppress the accuracy of the charging completion determination from being lowered.

More particularly, in the present embodiment, the first threshold value Ith1 is used as the determination criterion for the charging completion determination based on the electric current Ia1 detected by the first current sensor 22, whereas the second threshold Ith2 larger than the first threshold value Ith1 is used as the determination criterion for the charging completion determination based on the electric current Ia2 detected by the second current sensor 23. Consequently, it becomes possible to determine, when an abnormality has occurred in the first current sensor 22, completion of the charging of the main battery 21 in an early stage. As a result, it becomes possible to terminate the charging of the main battery 21 in a timely manner, thereby suppressing occurrence of overcharging of the main battery 21.

Second Embodiment

In the second embodiment, the target voltage in the CV charging is set to be lower when the charging completion determination is performed based on the electric current Ia2 detected by the second current sensor 23 than when the charging completion determination is performed based on the electric current Ia1 detected by the first current sensor 22.

Figure 4:
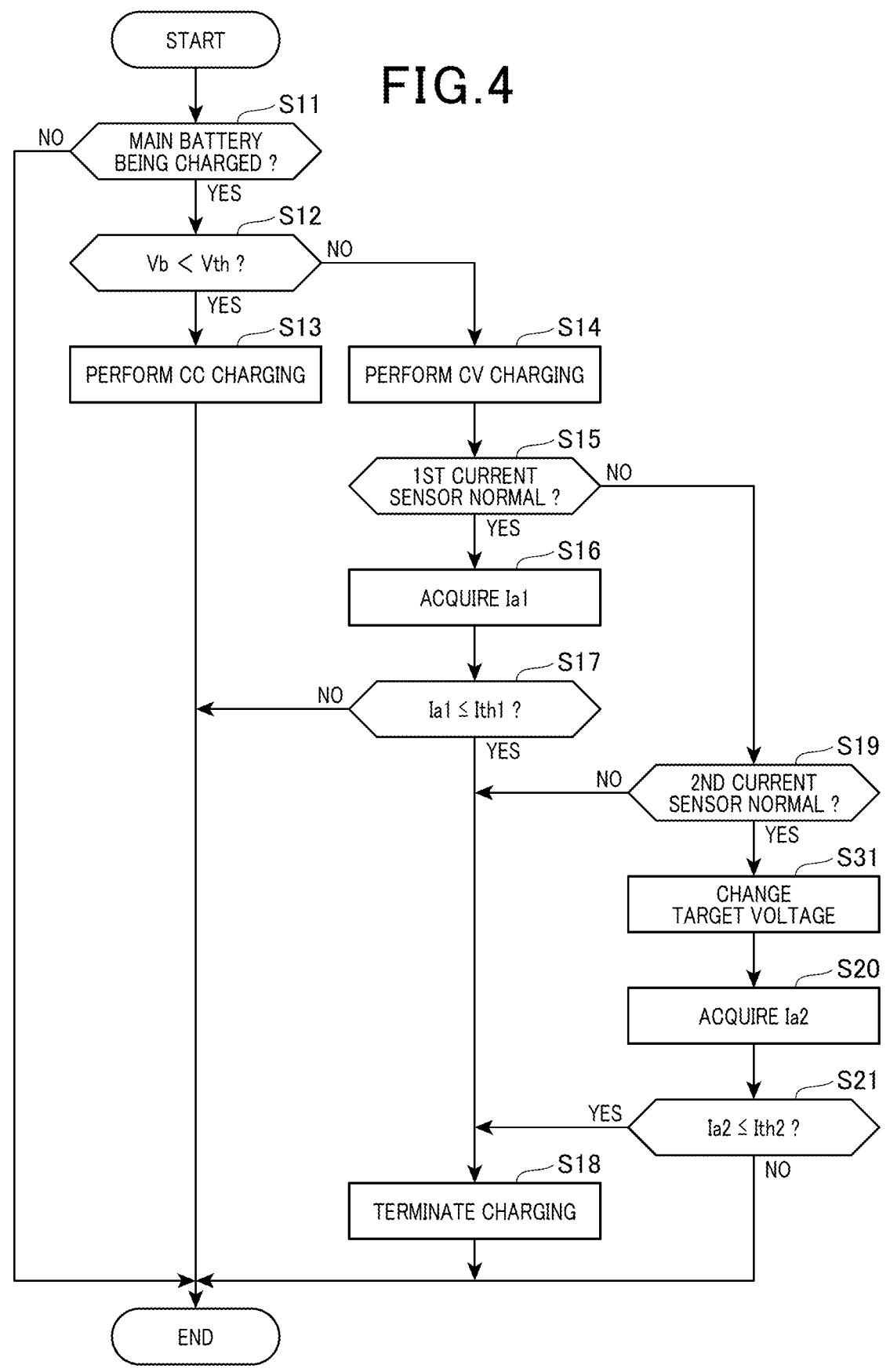
FIG. 4 is a flowchart illustrating steps of a charging control process according to a second embodiment.

FIG. 4 illustrates steps of a charging control process according to the second embodiment. This process is performed in lieu of the charging control process described in the first embodiment with reference to FIG. 3. It should be noted that: steps S11 to S21 in FIG. 4 are identical to steps S11 to S21 in FIG. 3; therefore explanation of these steps will not be repeated hereinafter.

As shown in FIG. 4, in the charging control process according to the second embodiment, if the second current sensor 23 is normal and thus the determination in step S19 results in a "YES" answer, i.e., when the charging completion determination is performed based on the electric current Ia2 detected by the second current sensor 23, the charging control process proceeds to step S31. In step S31, the target voltage in the CV charging is set to be lower than when the charging completion determination is performed based on the electric current Ia1 detected by the first current sensor 22. Then, the charging control process proceeds to step S20.

In the case of performing the charging completion determination using the second current sensor 23 that is lower in detection resolution than the first current sensor 22, when the CV charging rapidly progresses, the charging completion determination may be delayed, resulting in overcharging of the main battery 21. Moreover, during the CV charging, the slope of change of the charging current gradually decreases as the charging of the main battery 21 progresses. Therefore, with the charging completion determination being performed in an earlier stage, the slope of change of the charging current at the time of the charging completion determination will become sharper. In this regard, as described above, in the present embodiment, the target voltage in the CV charging is set to be lower when the charging completion determination is performed based on the electric current Ia2 detected by the second current sensor 23 than when the charging completion determination is performed based on the electric current Ia1 detected by the first current sensor 22. Consequently, it becomes possible to more reliably suppress occurrence of overcharging of the main battery 21.

Third Embodiment

In the third embodiment, when the charging completion determination is performed based on the electric current Ia2 detected by the second current sensor 23, it is determined that the charging of the main battery 21 has been completed based on the fact that the electric current Ia2 detected by the second current sensor 23 has become lower than or equal to the second threshold value Ith2 or the fact that a predetermined time has elapsed from the start of the CV charging, whichever comes first.

Figure 5:
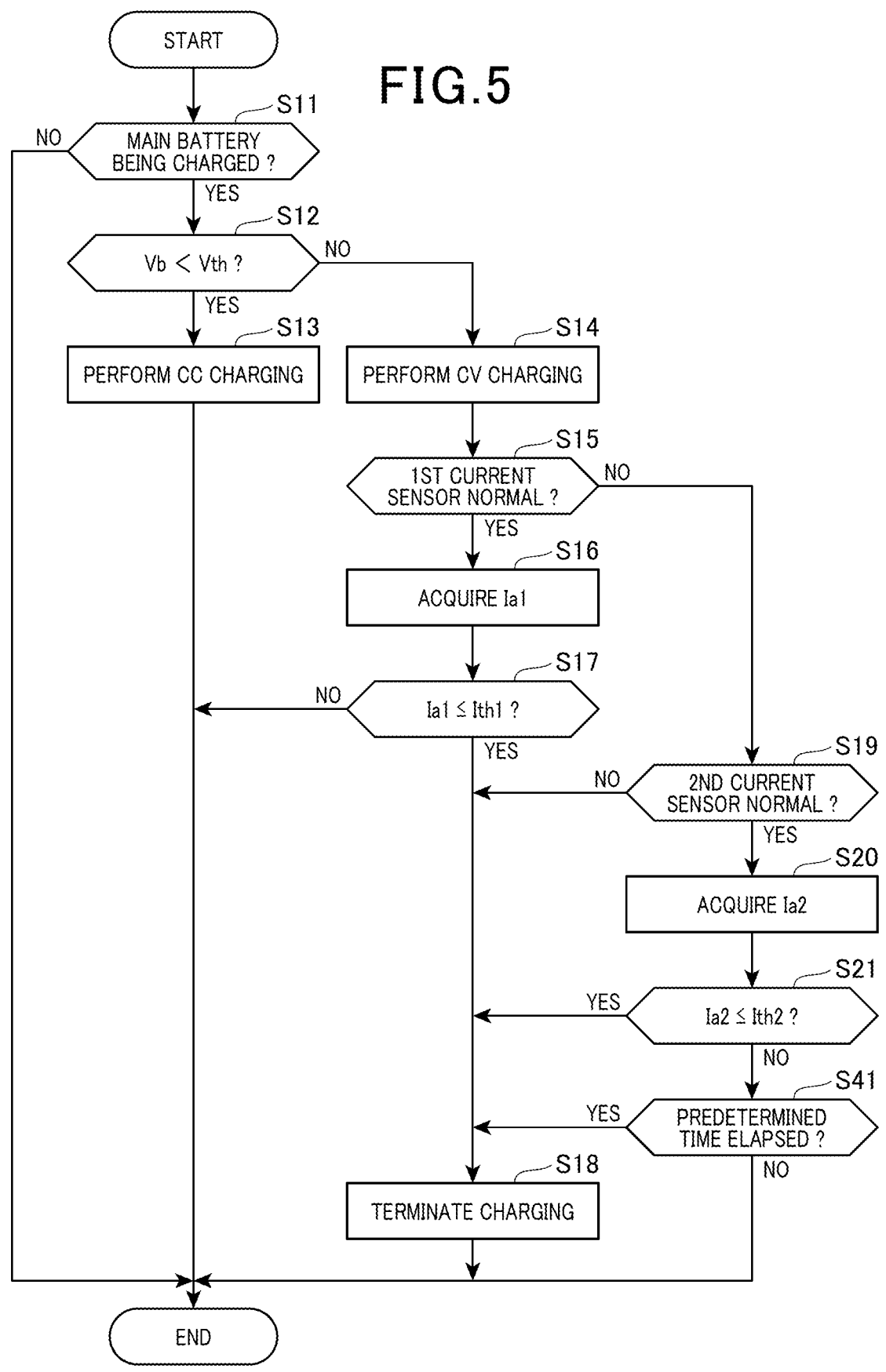
FIG. 5 is a flowchart illustrating steps of a charging control process according to a third embodiment.

FIG. 5 illustrates steps of a charging control process according to the third embodiment. This process is performed in lieu of the charging control process described in the first embodiment with reference to FIG. 3. It should be noted that: steps S11 to S21 in FIG. 5 are identical to steps S11 to S21 in FIG. 3; therefore explanation of these steps will not be repeated hereinafter.

As shown in FIG. 5, in the charging control process according to the third embodiment, if the electric current Ia2 detected by the second current sensor 23 is higher than the second threshold value Ith2 and thus the determination in step S21 results in a "NO" answer, the charging control process proceeds to step S41. In step S41, it is determined whether a predetermined time has elapsed from the start of the CV charging. If the determination in step S41 results in a "YES" answer, the charging control process proceeds to step S18, in which the charging of the main battery 21 by the external charging apparatus 100 is terminated. In contrast, if the determination in step S41 results in a "NO" answer, the charging control process directly terminates without performing step S18. Consequently, the CV charging is continued.

With the above steps S21 and S41, it is determined that the charging of the main battery 21 has been completed based on the fact that the electric current Ia2 detected by the second current sensor 23 has become lower than or equal to the second threshold value Ith2 or the fact that the predetermined time has elapsed from the start of the CV charging, whichever comes first.

According to the third embodiment, it becomes possible to perform the charging completion determination in an early stage and thereby suppress occurrence of overcharging of the main battery 21, while taking into account that the second current sensor 23 is lower in detection resolution and larger in detection error than the first current sensor 22. Moreover, if the predetermined time has elapsed from the start of the CV charging and before establishment of the charging completion determination using the second threshold value Ith2 as the determination criterion, it is determined, at the timing when the predetermined time has elapsed, that the charging of the main battery 21 has been completed. Consequently, in the case of the charging completion determination being performed using the second current sensor 23, even if the charging completion determination cannot be properly performed due to an error contained in the electric current Ia2 detected by the second current sensor 23, it is still possible to terminate the CV charging based on the fact that the predetermined time has elapsed from the start of the CV charging. As a result, it becomes possible to more reliably suppress occurrence of overcharging of the main battery 21.

Fourth Embodiment

In the fourth embodiment, when the main battery 21 is charged by the external charging apparatus 100, the charging mode is selectable between a normal charging mode and a rapid charging mode. In the rapid charging mode, the charging current is higher and the charging speed is faster than in the normal charging mode. Moreover, when an abnormality has occurred in the first current sensor 22, if the charging mode is the normal charging mode, it is determined that the charging of the main battery 21 has been completed based on the fact that the electric current Ia2 detected by the second current sensor 23 has become lower than or equal to the second threshold value Ith2. Otherwise, if the charging mode is the rapid charging mode, it is determined that the charging of the main battery 21 has been completed based on the fact that the CC charging has been completed.

Figure 6:
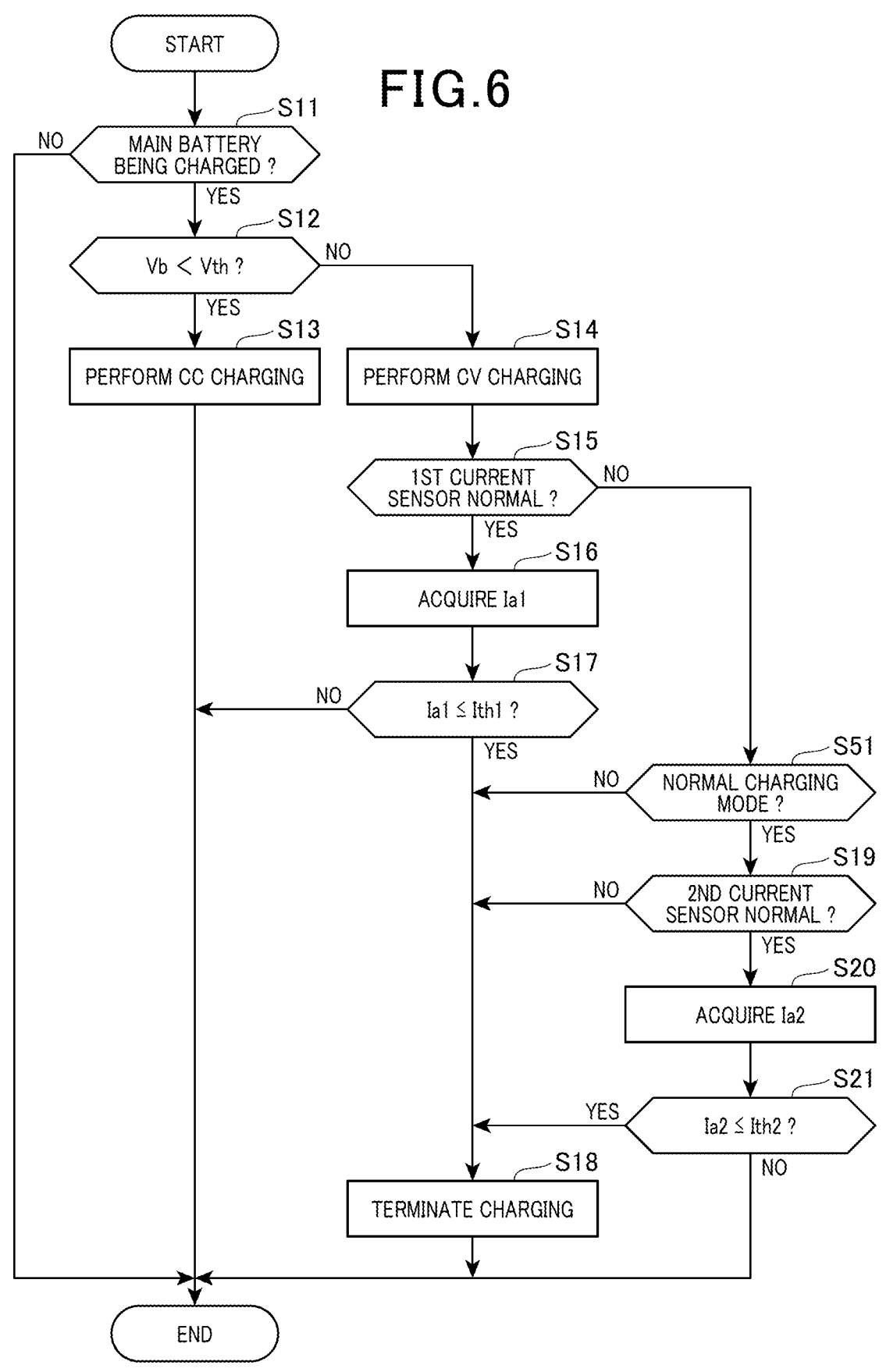
FIG. 6 is a flowchart illustrating steps of a charging control process according to a fourth embodiment.

FIG. 6 illustrates steps of a charging control process according to the fourth embodiment. This process is performed in lieu of the charging control process described in the first embodiment with reference to FIG. 3. It should be noted that: steps S11 to S21 in FIG. 6 are identical to steps S11 to S21 in FIG. 3; therefore explanation of these steps will not be repeated hereinafter.

As shown in FIG. 6, in the charging control process according to the fourth embodiment, if the first current sensor 22 is abnormal and thus the determination in step S15 results in a "NO" answer, the charging control process proceeds to step S51. In step S51, it is determined whether the charging mode is the normal charging mode. If the charging mode is the normal charging mode and thus the determination in step S51 results in a "YES" answer, the charging control process proceeds to step S19 and the charging completion determination is performed based on the electric current Ia2 detected by the second current sensor 23 (steps S19 to S21). In contrast, if the charging mode is the rapid charging mode and thus the determination in step S51 results in a "NO" answer, the charging control process proceeds to step S18, in which the charging of the main battery 21 by the external charging apparatus 100 is terminated. More specifically, when the determination in step S51 is performed, the determination in step S12 has already resulted in a "NO" answer, i.e., the CC charging has already been completed. Therefore, if the determination in step S51 results in a "NO" answer, the charging of the main battery 21 by the external charging apparatus 100 is immediately terminated.

In the case of performing the charging completion determination using the second current sensor 23 that is lower in detection resolution than the first current sensor 22, when the CV charging rapidly progresses, the charging completion determination may be delayed, resulting in overcharging of the main battery 21. In particular, when the charging mode in the CV charging is the rapid charging mode, overcharging of the main battery 21 is more likely to occur. In this respect, with the above configuration, the timing of the charging completion determination in the rapid charging mode can be made earlier than the timing of the charging completion determination in the normal charging mode, thereby suppressing occurrence of overcharging of the main battery 21.

Fifth Embodiment

In the fifth embodiment, the battery control apparatus 70 is configured to further include a correction unit. When the charging completion determination has been performed based on comparison between the electric current Ia2 detected by the second current sensor 23 and the second threshold value Ith2, the correction unit acquires the terminal voltage of the main battery 21 after the completion of the charging of the main battery 21. Then, the correction unit corrects the second threshold value Ith2 based on the acquired terminal voltage of the main battery 21. Here, based on the terminal voltage (or open circuit voltage) of the main battery 21, it is possible to determine the SOC (State Of Charge) of the main battery 21, i.e., the level of charge of the main battery 21 relative to its capacity; thus, it is possible to determine the suitability of the timing of the charging completion determination using the second threshold value Ith2.

FIG. 7 illustrates steps of a correction process for correcting the second threshold value Ith2 according to the fifth embodiment. This process is performed by the battery control apparatus 70 after any of the charging control processes shown in FIGS. 3-6 have been performed, i.e., after the charging of the main battery 21 by the external charging apparatus 100 has been performed.

As shown in FIG. 7, in the correction process, first, in step S61, it is determined whether the charging completion determination has been performed based on comparison between the electric current Ia2 detected by the second current sensor 23 and the second threshold value Ith2 during the charging of the main battery 21 by the external charging apparatus 100.

If the determination in step S61 results in a "NO" answer, the correction process directly terminates without performing the remaining steps. In contrast, if the determination in step S61 results in a "YES" answer, the correction process proceeds to step S62.

In step S62, the terminal voltage of the main battery 21, which is detected by the voltage sensor 24 when the main battery 21 is in a non-energized state, is acquired.

In step S63, the second threshold value Ith2 is corrected based on the terminal voltage of the main battery 21 acquired in step S62. Specifically, in this step, it is determined whether the terminal voltage of the main battery 21 is within a predetermined voltage range. If the terminal voltage of the main battery 21 is within the predetermined voltage range, the second threshold value Ith2 is kept unchanged (i.e., not corrected). On the other hand, if the terminal voltage of the main battery 21 is higher than an upper limit of the predetermined voltage range, it is determined that the main battery 21 is overcharged; thus, the second threshold value Ith2 is increased. Otherwise, if the terminal voltage of the main battery 21 is lower than a lower limit of the predetermined voltage range, it is determined that the main battery 21 is undercharged; thus, the second threshold value Ith2 is reduced. Alternatively, in step S63: the SOC of the main battery 21 may be calculated based on the terminal voltage of the main battery 21; and the second threshold value Ith2 may be corrected depending on whether the calculated SOC is within a predetermined range.

In step S64, the corrected second threshold value Ith2 is stored as a learned value in a backup memory such as a backup RAM or an EEPROM. At this time, if the second threshold Ith2 has been previously stored in the backup memory, the second threshold Ith2 is updated with the current corrected value. Thereafter, during the next external charging of the main battery 21, the charging completion determination is performed suitably using the corrected second threshold value Ith2 stored in the backup memory.

The second threshold value Ith2, which is compared with the electric current Ia2 detected by the second current sensor 23, may be set taking into account the magnitude of the error contained in the electric current Ia2 detected by the second current sensor 23. In order to suppress occurrence of overcharging of the main battery 21, it is preferable to provide a large margin for the second threshold value Ith2. On the other hand, however, if the second threshold value Ith2 is too large, the charging of the main battery 21 may be excessively limited.

In this respect, with the above configuration, it becomes possible to suppress occurrence of undercharging of the main battery 21 as well as occurrence of overcharging of the main battery 21.

Other Embodiments

The above-described embodiments may be modified, for example, as follows.

(1) In the above-described embodiments, the second threshold value Ith2 may be changed according to the deterioration degree of the main battery 21.

Figure 8:
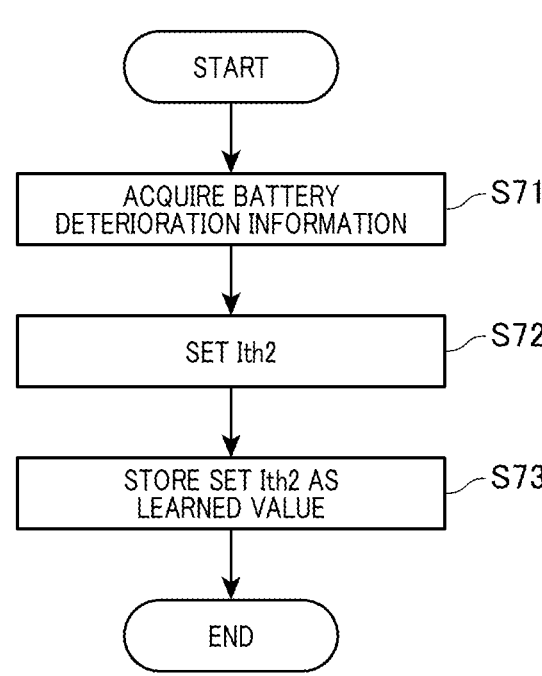
FIG. 8 is a flowchart illustrating steps of a setting process for setting a second threshold value according to a modification.

FIG. 8 illustrates steps of a setting process for setting the second threshold value Ith2 according to a modification. This process is performed by the battery control apparatus 70.

As shown in FIG. 8, in the setting process, first, in step S71, battery deterioration information, which indicates the deterioration degree of the main battery 21, is acquired. For example, the battery deterioration information may be represented by the internal resistance of the main battery 21; and the deterioration degree of the main battery 21 may be represented by the difference of the current internal resistance of the main battery 21 from the initial internal resistance of the main battery 21 when it was new.

Figure 9:
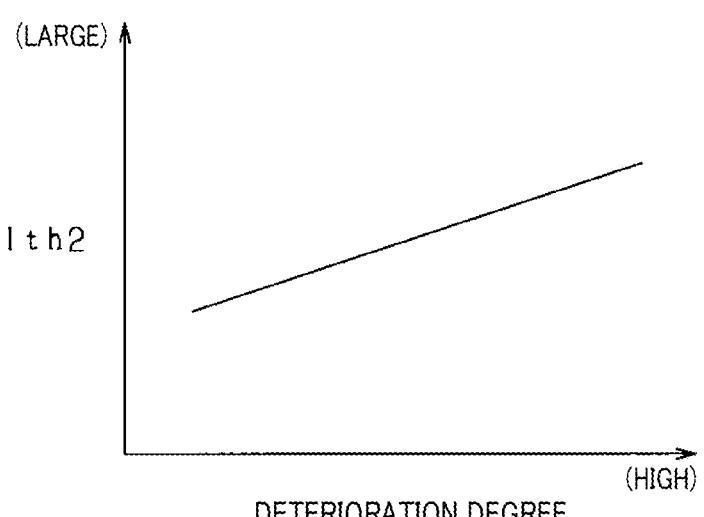
FIG. 9 is a graph illustrating the relationship between the storage battery deterioration degree and the second threshold value in the modification.

In step S72, the second threshold value Ith2 is set based on the battery deterioration information acquired in step S71. For example, the second threshold value Ith2 may be set based on the relationship between the deterioration degree of the main battery 21 and the second threshold value Ith2 as shown in FIG. 9; consequently, the higher the deterioration degree of the main battery 21, the larger the second threshold value Ith2 is set to be.

In step S73, the second threshold value Ith2 set in step S72 is stored as a learned value in a backup memory. At this time, if the second threshold Ith2 has been previously stored in the backup memory, the second threshold Ith2 is updated with the current set value. Thereafter, during the next external charging of the main battery 21, the charging completion determination is performed suitably using the set second threshold value Ith2 stored in the backup memory.

(2) In the above-described embodiments, the first current sensor 22 having the first current detection range is used for the battery charging control; and the second current sensor 23 having the second current detection range wider than the first current detection range is used for the motor control.

Alternatively, both the first and second current sensors 22 and 23 may be used for the battery charging control. Specifically, in this case, in a first stage of the battery charging where the charging current is higher than or equal to a predetermined value, the charging control may be performed using the second current sensor 23; and in a second stage of the battery charging where the charging current has decreased below the predetermined value, the charging control may be performed using the first current sensor 22.

(3) In the above-described embodiments, the present disclosure is applied to the power supply system of the electric vehicle 10. However, the present disclosure can also be applied to other power supply systems than vehicular power supply systems.

(4) The battery control apparatus 70 and the control method in each of the above-described embodiments may be realized by a dedicated computer that includes a processor, which is programmed to perform one or more functions embodied by a computer program, and a memory. As an alternative, the battery control apparatus 70 and the control method in each of the above-described embodiments may be realized by a dedicated computer that includes a processor configured with one or more dedicated hardware logic circuits. As another alternative, the battery control apparatus 70 and the control method in each of the above-described embodiments may be realized by one or more dedicated computers configured with a combination of a processor programmed to perform one or more functions, a memory and a processor configured with one or more dedicated hardware logic circuits. In addition, the computer program may be stored as computer-executable instructions in a computer-readable non-transitory tangible recording medium.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A storage battery control apparatus to be applied to a power supply system, the power supply system comprising a storage battery and first and second current sensors that detect electric current inputted/outputted to/from the storage battery, the first current sensor having a first current detection range, the second current sensor having a second current detection range that is wider than the first current detection range, the storage battery control apparatus being configured to perform a charging completion determination when the storage battery is charged by a charging apparatus, the storage battery control apparatus comprising:

an abnormality determination unit that determines whether an abnormality has occurred in the first current sensor;

a first charging control unit that performs, when it is determined by the abnormality determination unit that no abnormality has occurred in the first current sensor, the charging completion determination based on the electric current detected by the first current sensor; and a second charging control unit that performs, when it is determined by the abnormality determination unit that an abnormality has occurred in the first current sensor, the charging completion determination based on the electric current detected by the second current sensor, wherein a determination criterion with which the first charging control unit performs the charging completion determination is different from a determination criterion with which the second charging control unit performs the charging completion determination.

2. The storage battery control apparatus as set forth in claim 1, wherein:

the first charging control unit determines that the charging of the storage battery has been completed in response to the electric current detected by the first current sensor having become lower than or equal to a first threshold value; and the second charging control unit determines that the charging of the storage battery has been completed in response to the electric current detected by the second current sensor having become lower than or equal to a second threshold value larger than the first threshold value.

3. The storage battery control apparatus as set forth in claim 2, wherein:

the storage battery control apparatus controls the charging of the storage battery by the charging apparatus so that constant-current charging is first performed and then constant-voltage charging is performed;

in the constant-current charging, the storage battery is charged with the charging current of the charging apparatus kept at a constant value;

in the constant-voltage charging, the storage battery is charged with the charging voltage of the charging apparatus kept at a constant value; and a target voltage in the constant-voltage charging is set to be lower when the charging completion determination is performed by the second charging control unit than when the charging completion determination is performed by the first charging control unit.

4. The storage battery control apparatus as set forth in claim 1, wherein:

the storage battery control apparatus controls the charging of the storage battery by the charging apparatus so that constant-current charging is first performed and then constant-voltage charging is performed;

in the constant-current charging, the storage battery is charged with the charging current of the charging apparatus kept at a constant value;

in the constant-voltage charging, the storage battery is charged with the charging voltage of the charging apparatus kept at a constant value;

the first charging control unit determines that the charging of the storage battery has been completed in response to the electric current detected by the first current sensor having become lower than or equal to a first threshold value; and the second charging control unit determines that the charging of the storage battery has been completed in response to the electric current detected by the second current sensor having become lower than or equal to a second threshold value larger than the first threshold value or to a predetermined time having elapsed from the start of the constant-voltage charging, whichever comes first.

5. The storage battery control apparatus as set forth in claim 1, wherein:

the storage battery control apparatus controls the charging of the storage battery by the charging apparatus so that constant-current charging is first performed and then constant-voltage charging is performed;

in the constant-current charging, the storage battery is charged with the charging current of the charging apparatus kept at a constant value;

in the constant-voltage charging, the storage battery is charged with the charging voltage of the charging apparatus kept at a constant value;

the charging mode of the storage battery is selectable between a normal charging mode and a rapid charging mode;

the first charging control unit determines that the charging of the storage battery has been completed in response to the electric current detected by the first current sensor having become lower than or equal to a first threshold value;

when the charging mode is the normal charging mode, the second charging control unit determines that the charging of the storage battery has been completed in response to the electric current detected by the second current sensor having become lower than or equal to a second threshold value larger than the first threshold value; and when the charging mode is the rapid charging mode, the second charging control unit determines that the charging of the storage battery has been completed in response to the constant-current charging having been completed.

6. The storage battery control apparatus as set forth in claim 2, further comprising a correction unit that acquires, when the charging completion determination has been performed by the second charging control unit using the second threshold value, a terminal voltage of the storage battery after the completion of the charging of the storage battery and corrects the second threshold value based on the acquired terminal voltage of the storage battery.

7. The storage battery control apparatus as set forth in claim 3, further comprising a correction unit that acquires, when the charging completion determination has been performed by the second charging control unit using the second threshold value, a terminal voltage of the storage battery after the completion of the charging of the storage battery and corrects the second threshold value based on the acquired terminal voltage of the storage battery.

8. The storage battery control apparatus as set forth in claim 4, further comprising a correction unit that acquires, when the charging completion determination has been performed by the second charging control unit using the second threshold value, a terminal voltage of the storage battery after the completion of the charging of the storage battery and corrects the second threshold value based on the acquired terminal voltage of the storage battery.

9. The storage battery control apparatus as set forth in claim 5, further comprising a correction unit that acquires, when the charging completion determination has been performed by the second charging control unit using the second threshold value, a terminal voltage of the storage battery after the completion of the charging of the storage battery and corrects the second threshold value based on the acquired terminal voltage of the storage battery.

* * * * *